(12) United States Patent
Schuler et al.

(10) Patent No.: US 11,608,231 B2
(45) Date of Patent: Mar. 21, 2023

(54) CONVEYING APPARATUS AND METHOD OF CONVEYING TAMPON APPLICATORS

(71) Applicant: Ruggli Projects AG, Hagendorn (CH)

(72) Inventors: Samuel Schuler, Basel (CH);
Antonello Zuddas, Neuhausen am Rheinfall (CH)

(73) Assignee: Ruggli Projects AG, Hagendorn (CH)

( * ) Notice: Subject to any disclaimer, the term of this patent is extended or adjusted under 35 U.S.C. 154(b) by 0 days.

(21) Appl. No.: 17/273,584

(22) PCT Filed: Jun. 4, 2019

(86) PCT No.: PCT/EP2019/064443
§ 371 (c)(1),
(2) Date: Mar. 4, 2021

(87) PCT Pub. No.: WO2019/233989
PCT Pub. Date: Dec. 12, 2019

(65) Prior Publication Data
US 2021/0292102 A1    Sep. 23, 2021

(30) Foreign Application Priority Data

Jun. 5, 2018 (CH) .................................. 00713/18

(51) Int. Cl.
*B65G 15/10* (2006.01)
*B65G 47/53* (2006.01)
(Continued)

(52) U.S. Cl.
CPC .......... *B65G 47/53* (2013.01); *B65G 15/105* (2013.01); *B65G 47/74* (2013.01); *B65G 49/00* (2013.01)

(58) Field of Classification Search
CPC ....... B65G 15/10; B65G 15/105; B65G 47/54
(Continued)

(56) References Cited

U.S. PATENT DOCUMENTS

| 2,624,078 A | 1/1953 | Winter et al. |
| 3,978,979 A * | 9/1976 | Mezey ................... B65G 47/14 198/817 |

(Continued)

FOREIGN PATENT DOCUMENTS

| DE | 41 19 790 A1 | 12/1992 |
| DE | 43 35 195 A1 | 4/1995 |

(Continued)

OTHER PUBLICATIONS

International Search Report in PCT/EP2019/064443, dated Nov. 21, 2019.

*Primary Examiner* — Douglas A Hess
(74) *Attorney, Agent, or Firm* — Collard & Roe, P.C.

(57) ABSTRACT

The present invention relates to a conveying apparatus for tampon applicators 100, having a first conveyor track 2, which comprises two transport belts 3.1, 3.2 which are arranged spaced apart from each other. The transport belts each have a bearing axis L1, L2. The conveying apparatus according to the invention furthermore has a first conveyor drive 4 for driving at least one of the two spaced-apart transport belts 3.1, 3.2, and transport belts which are arranged spaced apart from each other in such a manner that a tampon applicator 100 which is to be conveyed rests on the two transport belts in an intermediate space D between the transport belts. The bearing axes L1, L2 of the transport belts 3.1, 3.2 are arranged parallel; in particular in the case of transport belts having the same conveying direction F. The present invention furthermore relates to a method of conveying tampon applicators.

18 Claims, 7 Drawing Sheets

(51) Int. Cl.
 *B65G 47/74* (2006.01)
 *B65G 49/00* (2006.01)

(58) Field of Classification Search
 USPC .................................................. 198/620, 817
 See application file for complete search history.

(56) References Cited

U.S. PATENT DOCUMENTS

| | | | |
|---|---|---|---|
| 4,321,993 A | 3/1982 | Hinzmann et al. | |
| 4,431,104 A * | 2/1984 | Orlowski | B65G 47/647 198/431 |
| 4,717,027 A * | 1/1988 | Laure | B07B 13/04 209/665 |
| 5,203,446 A * | 4/1993 | Ufland | B65G 19/02 198/844.2 |
| 5,673,784 A * | 10/1997 | Karpinsky | B65G 15/02 198/817 |
| 5,915,525 A * | 6/1999 | Baker | H05K 13/0061 198/604 |
| 6,347,697 B1 * | 2/2002 | Ouellette | B65G 43/08 198/369.5 |
| 6,374,537 B1 * | 4/2002 | Van Wingerden | A01G 31/042 47/17 |
| 6,629,595 B2 * | 10/2003 | Wiese | B65G 15/105 198/459.8 |
| 6,889,817 B2 * | 5/2005 | Leisner | B65G 15/02 198/817 |
| 8,047,756 B2 * | 11/2011 | Tuffs | G05D 1/0225 198/463.3 |
| 8,397,905 B1 * | 3/2013 | Tritz | B65G 15/105 198/817 |
| 8,728,022 B2 | 5/2014 | Tamburin | |
| 8,881,888 B2 * | 11/2014 | Overley | B65B 25/146 198/817 |
| 9,540,127 B2 * | 1/2017 | Papsdorf | B65G 47/082 |
| 9,731,848 B2 * | 8/2017 | Suzuki | B65B 35/205 |
| 10,252,868 B2 * | 4/2019 | Aldazabal Badiola | B65G 57/00 |
| 2003/0146071 A1 | 8/2003 | Wiese et al. | |

FOREIGN PATENT DOCUMENTS

| | | |
|---|---|---|
| DE | 295 06 230 U1 | 6/1995 |
| EP | 2 335 666 A1 | 6/2011 |
| EP | 2 821 042 A1 | 1/2015 |
| EP | 2 398 437 B1 | 4/2015 |
| EP | 2 389 437 B1 | 10/2015 |
| EP | 3 064 455 A1 | 9/2016 |
| GB | 1389820 A | 4/1975 |
| JP | S63-37023 A | 2/1988 |
| KR | 101840007 B1 | 3/2018 |
| NL | 9000982 A | 11/1991 |
| WO | 2015/000827 A1 | 1/2015 |

\* cited by examiner

CONVEYING APPARATUS AND METHOD OF CONVEYING TAMPON APPLICATORS

CROSS REFERENCE TO RELATED APPLICATIONS

This application is the National Stage of PCT/EP2019/064443 filed on Jun. 4, 2019, which claims priority under 35 U.S.C. § 119 of Swiss Application No. 00713/18 filed on Jun. 5, 2018, the disclosure of which is incorporated by reference. The international application under PCT article 21(2) was not published in English.

The present invention relates to a conveying apparatus for tampon applicators, and to a method of conveying tampon applicators, in particular in a production line for tampons with applicators; all according to the preamble of the independent patent claims.

TECHNOLOGICAL BACKGROUND

Tampon applicators are generally tubular insertion aids composed of plastic for tampons. In their simplest construction, they have a sleeve body with a distal opening through which the tampon is released after being placed into the body orifice. The tampon is ejected by means of a proximally applied plunger. Pushing of the plunger into the sleeve body presses the tampon contained in the latter through said distal opening. More developed forms have a rounded distal head end which is provided with incisions which open in the manner of a flower when the tampon is pressed out. Recessed grips or ribbed portions also belong nowadays to the standard configurations for facilitating practicality. The plunger is frequently a small tube through which a retrieving thread of the tampon is guided. The plunger is held during use so that it can be safely placed.

The present invention is suitable for example for tampons having applicators, as are shown in EP 3,016,623 A1 or EP 2 398,437 B1.

In the production of applicator tampons, i.e. tampons which are sold assembled in applicators, the tampon applicators which are conventionally produced by injection molding are initially supplied as loose articles to the manufacturing process.

Systems for conveying tampon applicators in a production line are known from the prior art. The current solutions provide conveying via conveyor tracks following a first sorting step. So that the individual tampon applicators do not drop off the conveyor belt, a lateral guide is provided in such solutions. The conveyor belts also take up a large space in the production lines. Intermediate stations for sorting the tampon applicators, which are dumped unsorted, likewise have to be provided. Tampon applicators basically have to be supplied in a certain orientation for assembly with the tampons. Since the tampon applicators in most cases arrive at the assembly from the injection molding as loose articles, the tampon applicators, which are oriented randomly on the first conveyor belt, have to be brought into a uniform orientation. In the case of high-quality materials, there is also the risk due to the side delimitations of the tampon applicators being damaged. Sometimes, individual tampon applicators may be caught together with others. The separating on such conveyor belts has turned out to be complicated and error-prone. An applicator oriented incorrectly may lead to the entire assembly unit shutting down.

There is thus a need for devices and methods for conveying and supplying tampon applicators in an applicator tampon production line, which can be operated efficiently and permit gentle handling of the applicators.

SUMMARY OF THE INVENTION

It is therefore an object of the present invention to overcome at least one disadvantage of the prior art. In particular, the intention is to provide a conveying apparatus for tampon applicators and a method for conveying tampon applicators that complies with the exacting requirements of continuous assembly of tampon applicators and, in the process, permits gentle handling of the tampon applicators.

This object has been achieved with a conveying apparatus for tampon applicators and a method for conveying tampon applicators according to the characterizing part of the independent claims.

One aspect of the present invention relates to a conveying apparatus for tampon applicators. The conveying apparatus according to the invention has a first conveyor track. Said conveyor track furthermore comprises two transport belts which are arranged spaced apart from each other and each have a bearing axis, in particular a common bearing axis.

The conveying apparatus furthermore comprises a first conveyor drive for driving at least one of the two spaced-apart transport belts. The transport belts are arranged here spaced apart from one another in such a manner that a tampon applicator which is to be conveyed rests on the two transport belts in an intermediate space between the transport belts. The conveying apparatus according to the invention is furthermore configured in such a manner that the bearing axes of the transport belts of a conveyor track are arranged parallel. In particular, all of the bearing axes of the transport belts of a conveyor track, and/or of all of the conveyor tracks which convey in the same conveying direction, are arranged parallel. In particular, all of the bearing axes of the conveyor tracks which convey in an identical conveying direction are arranged parallel. Particularly preferably, all of the bearing axes which are arranged parallel are driven via a common conveyor drive.

The conveying apparatus according to the invention permits conveying of tampon applicators, the conveying being particularly gentle for the applicators being conveyed. Thus, if they make contact with the two belts, there is substantially no sliding friction with the conveying means, which protects the product particularly in the case of high-quality materials. In addition, the conveying apparatus according to the invention can be installed in a particularly space-saving manner since the individual conveyor tracks are only insubstantially wider than the tampon applicators to be conveyed. The entire system can also be maintained particularly simply. Possible abrasion and dirt drops down between the individual transport belts, and therefore the tampon applicators being conveyed are not affected by dust and abrasion. The use of transport belts also makes the system easier to put into operation during installation and maintenance since it is less complicated to brace transport belts than to set up conveyor belts. In addition, the conveying apparatus according to the invention can be modularly adapted with conveyor tracks arranged parallel to the specific supply requirements of a downstream assembly station. The conveyor tracks cannot only be arranged parallel to one another horizontally, but also can be stacked vertically and diagonally.

Within the context of the present invention, the transport belts are preferably closed round belts arranged in a circulating manner. However, in particular embodiments, it is also possible to provide transport belts which do not have a round cross section, but rather have a substantially radially symmetrical cross section.

The transport belts can preferably be manufactured from a plastics material, particularly preferably from a polyurethane plastic. The transport belts are particularly preferably made from a flexible plastic. A complicated bracing operation, as is required for example in conveyor belts, is unnecessary if elastic transport belts, in particular round belts, are used. The round belts can be braced, for example, using tension rollers.

Within the context of the present invention, two transport belts which are arranged spaced apart from each other can be understood as meaning any arrangement in which, for the two relevant transport belts over their entire longitudinal axis, no physical contact is provided between the relevant transport belts. This could be realized even from a minimum intermediate space, for example from 1 mm, to an intermediate space in which a tampon applicator still just rests thereon without dropping through. The intermediate space is preferably between 1 mm and 15 mm, particularly preferably between 2 mm and 13 mm, furthermore preferably between 4 mm and 8 mm, in particular 7.5 mm. In a further particular embodiment, a center point distance between the center point of the cross section perpendicular to the longitudinal axis of a first transport belt to the corresponding center point of the transport belt arranged parallel is essentially 13 mm.

Within the context of the present invention, resting of a tampon applicator to be conveyed on the two transport belts is understood as meaning that said tampon applicator has at least one physical contact with each of the two transport belts. However, depending on the geometry of the tampon applicator to be conveyed, this can mean that each of the two transport belts can have more than one physical contact with the tampon applicator, however. In the case of tampon applicators which have a recessed grip, there can be a plurality of physical contacts with a transport belt. Within the context of the present invention, a conveyor drive can be understood as meaning a drive which is suitable for driving the transport belts on their bearing axis along a conveying direction.

In a particular embodiment, the conveyor drive comprises a drive, at least one drive shaft and at least one conveyor roller. In a particular embodiment, the bearing axis can be configured as a drive shaft which drives the conveyor roller. The drive can take place, for example, via a servomotor.

In a particular embodiment, the conveyor drive comprises precisely one drive for all of the conveyor tracks which convey in the same conveying direction, and one drive shaft and one conveyor roller per conveyor track. An individual drive can thus drive all of the conveyor tracks arranged with bearing axes running parallel.

The conveying apparatus according to the invention makes it possible in particular to take into account increased hygiene specifications in a production process for tampon applicators. The overall result from using transport belts is negligible abrasion.

Within the context of the present invention, a bearing axis can be understood as meaning a bearing axis which is provided substantially perpendicularly to the longitudinal extent of a transport belt. The bearing axis is preferably at the same time the axis of rotation of a circulating roller via which said transport belt is guided.

In a particularly preferred embodiment, one of the bearing axes of a transport belt is at the same time the drive shaft via which the conveyor drive drives the transport belt.

The device according to the invention can be configured, in a particular embodiment, with further circulating rollers in order to maintain a tension of the conveyor belt. The additional circulating rollers for the two transport belts of a conveyor track are particularly preferably configured parallel.

In a particular embodiment, the transport belts have a plurality of bearing axes which are in each case the axes of rotation of circulating rollers via which the transport belts are guided. All of the bearing axes of a first transport belt are particularly preferably parallel to the bearing axes of the second transport belt.

In a particularly preferred embodiment, the bearing axes of the first transport belt are concentric with the bearing axes of the second transport belt.

In a further particularly preferred embodiment, the transport belts share respective circulating rollers.

In a particular embodiment, the conveying apparatus according to the invention makes it possible for the intermediate space to be adapted to the dimensions of a tampon applicator to be transported. The intermediate space is optimally selected in such a manner that the tampon applicator rests on the two transport belts and, in the process, is guided laterally.

The tampon applicator particularly preferably rests on a first transport belt in a region of from between 3 and 6 o'clock. Correspondingly, the tampon applicator rests on the second transport belt in a region of from between 6 and 9 o'clock. This orientation should be understood as meaning with respect to the axis of rotation of the tampon applicator.

The tampon applicator particularly preferably rests in a region of from between 4 and 5 o'clock on the first transport belt, and a region of from between 7 and 8 o'clock on the second transport belt.

In a particular embodiment, the conveyor track is configured in such a manner that the intermediate space between the transport belts can be adjusted. For this purpose, for example, the transport belts can be arranged toward each other or away from each other along their longitudinal axis and can be fixed by means of a locking means. This can be helpful in particular for optimally accommodating different applicator dimensions, for example with a contact region, as has been explained above.

In a particular embodiment, the conveying apparatus according to the invention comprises an orientation unit which is mounted downstream of the first conveyor track, for rotating a supplied tampon applicator from a first orientation into a second orientation.

In a particular embodiment, the orientation unit mounted downstream of the first conveyor track is configured in such a manner that it transfers a conveying direction of a supplied tampon applicator from a first conveying direction to a second conveying direction, in particular at the same time as the supplied tampon applicator is rotated from the first orientation into the second orientation.

In previously mentioned orientation units for tampon applicators, it is constantly only the orientation of the applicator on a conveyor belt which is changed, the conveyor belt after rotation continuing to run in the same conveying direction. By means of the simultaneous rotation and changing of the conveying direction with the orientation unit according to the invention, the entire conveying apparatus can be set up in a more space-saving manner. A plurality of conveyor tracks running parallel next to one another and/or offset vertically can be arranged with adapted conveying speeds in a comparatively small space. The conveying speed can be adapted here to the length of a conveyor track in order to take into account the geometry of a shorter conveyor track lying in a rotation on the inside. Within the context of the present invention, the orientation of a tampon applicator on the conveyor track arises with respect to the conveying direction of the conveyor track. Tampon applicators have a distal head end and a proximal end. The proximal end serves for the fastening of a plunger which is responsible during operation for ejecting the tampon out of a tampon applicator through the distal head end by the plunger being pushed into a sleeve-shaped cavity. Although the distal head end or the proximal end is at the front with respect to the conveying direction, this is of minor significance for the concept of the present invention. What is crucial for the further processing of tampon applicators is, however, a uniform orientation at the latest at the assembly station. Since in most cases the tampon applicators are initially sorted as loose articles in the conveying apparatus, they pass onto the conveyor track in different orientations. With the conveying apparatus according to the invention, comprising an orientation unit which is mounted downstream, it can be ensured that all of the tampon applicators have a certain orientation in further conveyor tracks mounted downstream or in subsequent process steps.

In a preferred embodiment, the orientation unit which is mounted downstream comprises a housing chamber into which the first conveyor track opens in such a manner that a tampon applicator transported thereon is conveyed into said housing chamber by the movement of the transport belts.

In a particular embodiment, the orientation unit comprises a detector for identifying the first orientation and/or the second orientation of a supplied tampon applicator. Within the context of the present invention, a detector can be configured in particular in order to identify a distal head end or a proximal end of a tampon applicator. This can be undertaken in a particular embodiment by means of visual detection by a camera detecting the introduced tampon applicators and a computer-assisted image evaluation taking place which identifies the orientation of said tampon applicator. Depending on the identified orientation, it is possible, for example, for the orientation unit to be instructed to carry out a rotation in the one or other direction of rotation.

In an alternative embodiment, the orientation unit is configured and arranged in the conveying apparatus in such a manner that the orientation unit always carries out a rotation, but the direction of rotation is selected such that the subsequent conveying operation is always continued for all of the supplied tampon applicators in a certain orientation. For this purpose, the orientation unit can be configured in such a manner that it carries out a rotation about a certain angle, depending on how the supplied tampon applicator is oriented.

With an optical detector, an orientation of a supplied tampon applicator can be safely and reliably identified in a space-saving manner. Alternatively, detectors which detect an orientation of a tampon applicator haptically, or piezoelectrically, or electromagnetically, are also conceivable for carrying out this particular embodiment.

In a particular embodiment, the detector is designed in such a manner that it monitors an individual conveyor track and identifies the orientation of the supplied tampon applicators on said conveyor track. Alternatively or additionally, a detector can be provided which monitors a series of conveyor tracks arranged parallel next to one another or above one another and either analyzes individual image sections with computer assistance and/or analyzes an entire image and correspondingly for all of the orientation units controlled by said detector triggers the subsequent rotational movement via a control computer.

In a particular embodiment, the detector is accommodated in the housing chamber of the orientation unit.

In a particular embodiment, the detector is an optical detector which monitors the conveyor track by means of a light beam, in particular a laser, and thus identifies the orientation of a supplied tampon applicator.

In a particular embodiment, the orientation unit is arranged between two conveyor tracks arranged consecutively in the conveying direction. The orientation unit can thereby rotate a tampon applicator, which is conveyed in a first orientation by the first conveyor track, into a second orientation for further conveying on the second conveyor track.

In a further particular embodiment of this concept, the first conveyor track and the second conveyor track are arranged with respect to each other in such a manner that they have different conveying directions The orientation unit thus not only carries out a step for correctly orienting a tampon applicator, but also permits the transfer of the tampon applicators from one conveying direction into another conveying direction. This arrangement can be particularly advantageous if the spatial geometry for supplying the applicators can be optimally used.

In a particular embodiment, the first conveyor track is arranged on a first conveying plane, and at least one further conveyor track is arranged on at least one second conveying plane. It is a particular advantage of the present invention that, with the space-saving conveyor tracks, the space for supplying the tampon applicators can be optimally used. This can be undertaken, for example, by a plurality of conveyor tracks running parallel to one another being able to be arranged vertically and/or diagonally with respect to one another. Conveying of tampon applicators can thus take place as it were over several stories, which can permit an overall greater supply of applicators to the downstream assembly device.

In a particular embodiment, the orientation unit comprises a rotary element for receiving a tampon applicator. In its simplest embodiment, such a rotary element can be configured as a rotary disk. However, the rotary element is preferably configured as a turnstile and is mounted in the orientation unit in such a manner that it can be rotated between at least two orientations. The turnstile is preferably always oriented between two conveyor tracks in such a manner that a turnstile opening always opens with respect to the longitudinal direction of the conveyor track such that a tampon applicator guided thereon can be introduced into the turnstile. During operation, the turnstile on account of a detector would identify the orientation of the supplied tampon applicator and, depending thereon, would undertake a rotational movement in a certain direction and in a certain angle of rotation. By means of the configuration of a turnstile in the orientation unit, the latter can be optimally loaded, and only a comparatively small angle has to be bridged.

In a particular embodiment, the orientation unit comprises a baseplate. The baseplate has a recess through which a tampon applicator which is in a certain second orientation can move along its longitudinal extent. For example, a rotated tampon applicator, as soon as it is in the corresponding orientation, can drop through the recess and drop directly onto a second conveyor track, on which it is moved further along a second conveying direction.

The baseplate can be arranged in a fixed position in the orientation unit such that a rotary element can be arranged rotatably there above, and therefore tampon applicators can be rotated from a first orientation, in which they cannot drop through the recess, into a second orientation, allowing the tampon applicators to drop through the recess. This obviates the need, for example, for a specific ejector or another device which guides the tampon applicators out of the orientation unit again into the conveyor track.

The recess can be configured in such a manner that it substantially corresponds to the shape of a tampon applicator. In particular, the recess is configured as an elongate slot through which a tampon applicator fits along its wide axis. If the orientation unit is used to additionally bring about a rotation through 90 degrees in the conveying direction, the recess on the base plate is oriented at a 90 degree angle with respect to the first conveyor track. During operation, a tampon applicator conveyed into the orientation unit by the first conveyor track would find itself again in a turnstile. Said turnstile rotates the tampon applicator through a 90 degree angle, depending on the identified orientation, and, after the orientation of the tampon applicator has changed by the corresponding angle, said tampon applicator would drop through the recess onto a second conveyor track, which is arranged below the orientation unit.

In a particular embodiment, the conveying apparatus according to the invention comprises a plurality of conveyor tracks. It can have a plurality of parallel conveyor tracks, as described previously, and/or in addition can have a plurality of downstream conveyor tracks. The conveyor tracks can be oriented horizontally, i.e. in such a manner that a conveyed tampon applicator does not cover any height difference as it is being conveyed on a conveyor track. However, the conveyor tracks may also have a slight to medium inclination, and therefore the conveyed tampon applicator overall moves downward or upward while being conveyed along a conveyor track. It is helpful here to take into consideration the coefficients of friction of the transport belts. The inclination is preferably selected in such a manner that the conveyed tampon applicator remains positionally fixed by means of adhesion with respect to the transport belt while said tampon applicator is being conveyed.

By means of the conveying apparatus according to the invention and in particular by means of the parallel bearing axes, a plurality of conveyor tracks running parallel can be realized in a particularly space-saving manner. The conveyor tracks can subsequently enclose an angle with respect to downstream conveyor tracks. Said downstream conveyor tracks can differ in length from the first parallel conveyor tracks. All of the parallel conveyor tracks can be configured in such a manner that they have parallel bearing axes. They are particularly preferably driven by a single shaft.

In a particular embodiment, two consecutively arranged conveyor tracks enclose an angle with respect to each other. The angle is particularly preferably between 30 and 120 degrees, particularly preferably substantially 90 degrees.

Within the context of the present invention, essentially a 90 degree angle should be reached whenever a deviation from 90 degrees is no more than +/−5 degrees. It is self-evident that a possible orientation unit which can configure the corresponding rotation between two conveyor tracks arranged at an angle with respect to each other in such a manner that it is capable of compensating for a corresponding angular deviation. Preferably, however, an angle of precisely 90 degrees is enclosed since only the direction of a rotational movement of the orientation unit is thereby predetermined, and the rotated angle is fixed. As described at the beginning, the corresponding direction of rotation can be produced on the basis of the orientation of a supplied tampon applicator.

In a particular embodiment, the transport belts are designed to be radially symmetrical, particularly preferably round, in cross section perpendicularly to the longitudinal axis. An example of such a belt is, for example, a round belt. However, square, pentagonal, hexagonal, heptagonal and further polygonal belts are basically also conceivable for carrying out the present invention.

Round belts make it possible to always ensure that a tampon applicator rests optimally in the intermediate space between the transport belts. In addition, the guiding of the transport belts can be configured more efficiently, and the loading by means of the tension on the belt cross section is more balanced, which can lead to a lower degree of wear.

In a particular embodiment, transport belts according to the invention are round belts which run over rollers. Such belts are highly precise and easy to maintain. The conveyor drive can be configured as a head drive on an end side of the conveyor track. However, a center drive is also conceivable. The transport belts can be carried via rollers or else via sliding strips that have particularly low friction. For receiving the transport belts, the rollers can be provided with corresponding guide grooves which, when the transport belts are correctly tensioned, are also sufficient for a sufficient lateral guidance of the transport belt.

Further tensioning rollers can be provided which exert a certain tension on a conveyor track by means of a resetting force in order also always to ensure the lateral guidance for the transported tampon applicators.

The conveyor drive of the conveying apparatus can be configured in such a manner that it permits a continuous acceleration and deacceleration of the transport belt.

In a particular embodiment, the conveying direction according to the invention comprises at least one separating roller which is arranged on the conveyor track in such a manner that it engages in an intermediate space between the two spaced-apart transport belts. Said separating roller can be configured, for example, in such a manner that it is rotatable at a rotational speed which is higher than the conveying speed of the conveyor track concerned. As a result, for example, two tampon applicators which have become caught in each other during operation can be separated from each other. The roller grasps the first tampon and accelerates it away from the second tampon for a brief time more rapidly than the conveying direction of the conveyor track.

Alternatively and/or additionally, the conveying apparatus according to the invention manages entirely without a separate separating roller. For example, two consecutive conveyor tracks can be operated at a different speed. If a first tampon applicator passes from the first conveyor track, which is moved at a first conveying speed, onto the second conveyor track, which is moved at a second speed which is, for example, higher than the speed of the first conveyor track, said tampon applicator is accelerated away from a second tampon applicator which has possibly become caught together with the first tampon applicator. Separating can thereby take place without additional separating elements having to be provided.

In a particular embodiment, at least one separating roller is mounted upstream of the orientation unit in the conveying direction, and therefore the tampon applicators are conveyed separated to the orientation unit.

In a particular embodiment of the conveying apparatus according to the invention, a plurality of consecutive conveyor tracks are provided with different conveying speeds. For example, an irregularity in the supply of tampon applicators consisting of the loose articles can be compensated for by different conveying speeds separating the tampon applicators as a whole along the entire conveyor track and a better timed supply being possible.

In a particular embodiment, the conveying apparatus according to the invention comprises at least one stopper. The latter is arranged on the conveyor track in such a manner that it engages in an intermediate space between two spaced-apart transport belts. A further advantage of the device according to the invention with the spaced-apart transport belts is demonstrated here. Such a stopper can take effect, for example, in a buffer region of the conveying apparatus if a plurality of tampon applicators have to be provided for a next processing step, for example an assembly step. It is thus possible, for example, to enable appropriate frequencies at supplies of tampon applicators by a row of parallel conveyor tracks being able to be provided with corresponding stoppers which ensure a certain frequency.

In a particular embodiment, a conveyor track according to the invention which is intended to serve as a buffer comprises a plurality of stoppers. Furthermore, for example, stop detectors can be provided which identify whether a tampon applicator has been picked off by a downstream processing station and further processed. If a certain tampon applicator, for example, reaches one end of a conveying apparatus according to the invention, a detector can be provided which detects said tampon applicator as being parked and transmits a signal to a stopper which is mounted upstream and which stops a supplied tampon applicator. This buffer region can be provided with a plurality of such stoppers. One such conveyor track configured in the form of a buffer preferably has at least one stopper and at least one detector, preferably between one and 15 stoppers. Of course, a plurality of parallel conveyor tracks can be configured as a buffer zone and provided with corresponding stoppers.

In a particular embodiment, the stopper is configured as a lever which moves into the intermediate space between two transport belts and thus physically prevents a tampon applicator from moving further in the conveying direction.

In a particular embodiment, the transport belt of a conveyor track oriented for buffering can be provided with friction-reducing coatings such that a stopped tampon applicator is not damaged by the friction of the transport belt that continues to move. Alternatively or additionally, the transport belt of a conveyor track oriented for buffering can be composed of a low-friction plastic.

In a particular embodiment, the conveying apparatus according to the invention comprises at least one ejector for conveying a tampon applicator from one end of the conveyor track into an adjoining processing station, in particular an orientation unit mounted downstream. The ejector is then arranged on the conveyor track in such a manner that it engages in an intermediate space between the two spaced-apart transport belts.

In a particular embodiment, the conveyor drive drives the transport belts via a shaft which is arranged parallel to the longitudinal axes of said transport belts.

A further aspect of the present invention relates to a method for conveying tampon applicators. In particular, said method is carried out with a conveying apparatus, as described at the beginning. The method according to the invention comprises a series of steps. First of all, at least one tampon applicator, in particular a loose article of tampon applicators, is provided. The tampon applicators are supplied onto a first conveyor track. The latter has two transport belts which are arranged spaced apart from each other such that a tampon applicator which is to be conveyed rests on the two transport belts in an intermediate space between the transport belts. Subsequently, the tampon applicator is conveyed by the conveyor track in a first conveying direction.

The tampon applicators can be supplied, for example, via a shaking funnel which has a corresponding passage so that a path is used to place individual tampon applicators onto the conveyor track.

In a particular embodiment, the tampon applicator is conveyed by a first conveyor track in the conveying direction at a first conveying speed.

In a further particular embodiment, the tampon applicator is transferred from the first conveyor track onto a second conveyor track, wherein the second conveyor track moves the tampon applicator in the conveying direction at a second conveying speed. Said second conveying speed can be different from the first conveying speed; it is preferably higher than the first conveying speed.

In a particular embodiment, a tampon applicator is transferred between two conveyor tracks by an orientation unit from a first orientation into a second orientation. This step may be preceded by previous detection of an orientation via a detector.

In a particular embodiment, the rotation of the tampon applicator is dependent on the detected orientation thereof. The rotation can take place in particular in two directions. If the tampon applicator is already correctly oriented when the detection takes place, i.e. a first orientation which is suitable for the further processing is detected, rotation through 90 degrees from a first conveyor track onto a second conveyor track takes place. If it is established that the tampon applicator passes in the opposite orientation into the orientation unit, a rotational movement opposite to the first rotational movement is likewise carried out through 90 degrees. As a result, rotation through 90 degrees is likewise carried out, but the end which was originally in front in the conveying direction is now at the rear in the conveying direction.

In a particular embodiment, a series of tampon applicators is moved on a series of parallel conveyor tracks in the direction of a further processing station, in particular an assembly station. The conveyor tracks which are mounted directly upstream of the assembly station are configured as buffer tracks and have a series of stoppers which stop tampon applicators and prevent them from continuing along the conveyor track by extending into the intermediate space between the transport belts. This step can be controlled by stop detectors which establish whether a subsequent processing station is free, and/or whether a buffer zone connected downstream is or is not occupied by a tampon applicator.

A further aspect of the present invention relates to a method for operating a conveying apparatus, as described above.

It is self-evident to a person skilled in the art from the particular embodiments that they can occur in any combination in a configuration according to the invention if they do not exclude one another.

The present invention will now be explained in more detail below with reference to specific exemplary embodiments and figures, but without being restricted thereto.

DESCRIPTION OF THE FIGURES

The figures illustrate the present invention schematically, wherein, for the sake of simplicity, identical parts are provided with the same reference sign.

Schematically in the figures.

IMPLEMENTATION OF THE INVENTION

Figure 1:
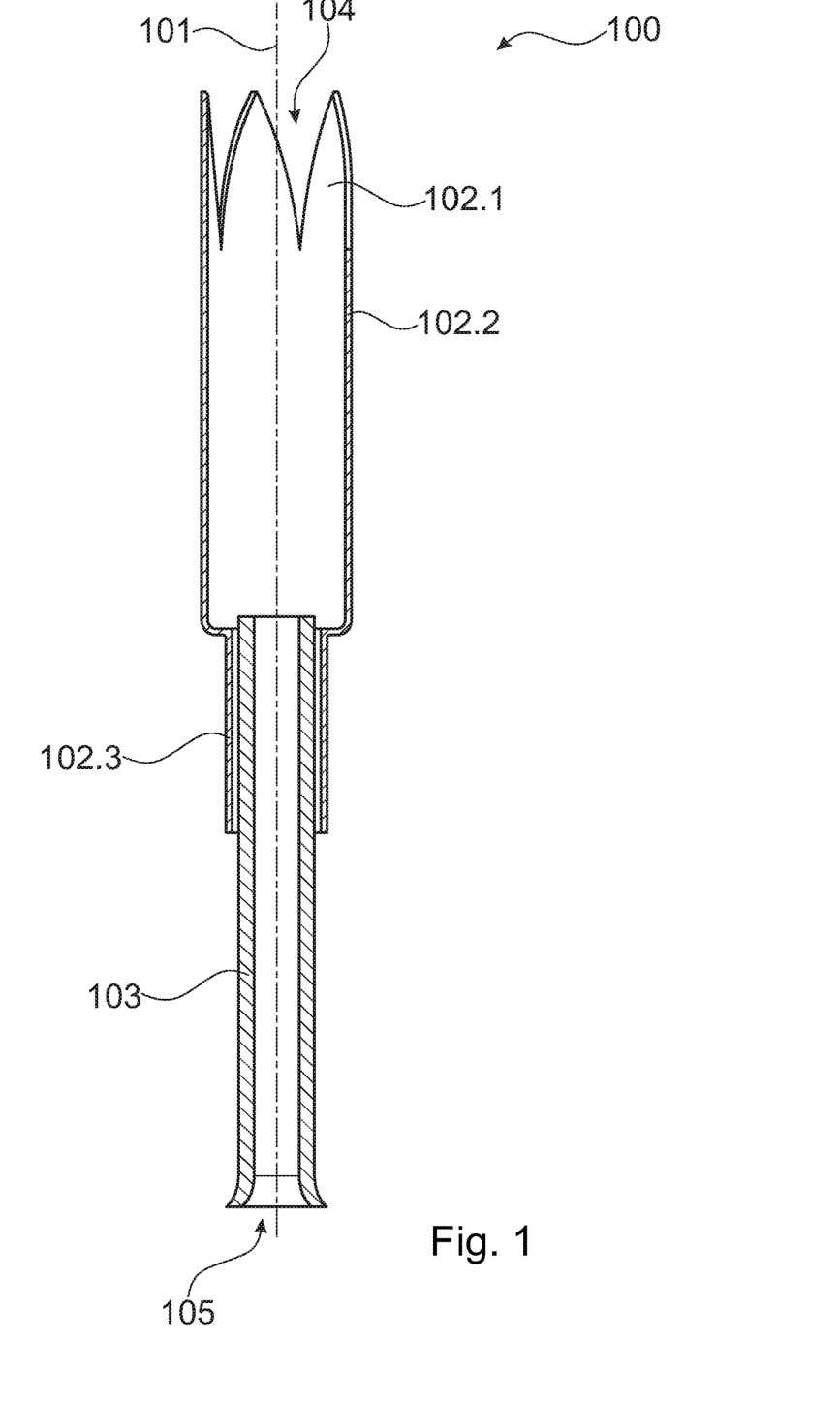
FIG. 1 shows a tampon applicator as can be conveyed with the conveying apparatus according to the invention.

FIG. 1 shows by way of example a tampon applicator 100 as can be conveyed with the device according to the invention. The tampon applicator 100 is substantially constructed in two parts. It is composed of a tampon body and a plunger 103. The plunger 103 is arranged in the tampon applicator 100 in such a manner that it can be displaced along the longitudinal axis 101. The tampon applicator 100 has a distal head end 104 with a head opening. The proximal thread opening 105 of the plunger 103, which is configured as a small tube, lies opposite.

The tampon body is divided into three regions. Incised wings configured in the form of a petal 102.1 are located at the distal head end 104. Said wings run into the sleeve body 102.2, which defines a tampon cavity. The sleeve body 102.2 is directly adjoined by a gripping region 102.3 which, in the present example, also serves for guiding the plunger 103. The sleeve body 102.2 serves for receiving a tampon, wherein, in the current assembly processes, the tampon is loaded into the tampon applicator via the distal head end 104. The proximal thread opening 105 serves to guide the retrieving thread to the outside. During operation, the plunger 103 is pushed into the cavity of the sleeve body 102.2, with the tampon being ejected through the distal head opening 104. The retrieving thread can be held back in the process.

For the present invention, one aspect of the conveying apparatus relates to the orientation of the tampon applicator at the end of the conveying apparatus. Whether the distal head end 104 or the proximal end 105 is at the front in the conveying direction is of insignificance and is determined by the manner in which the downstream assembly unit operates. A more crucial aspect is for all of the tampon applicators 100 to arrive in a certain orientation at the end of the conveying section. The geometry of the tampon applicators may cause individual petals to become caught together with following or previous tampon applicators, i.e. with their proximal head openings or distal ends. For most assembly stations, it is therefore of advantage if the tampon applicators at the end of the conveying apparatus are provided in very substantially separated form in a controlled supply.

Figure 2:
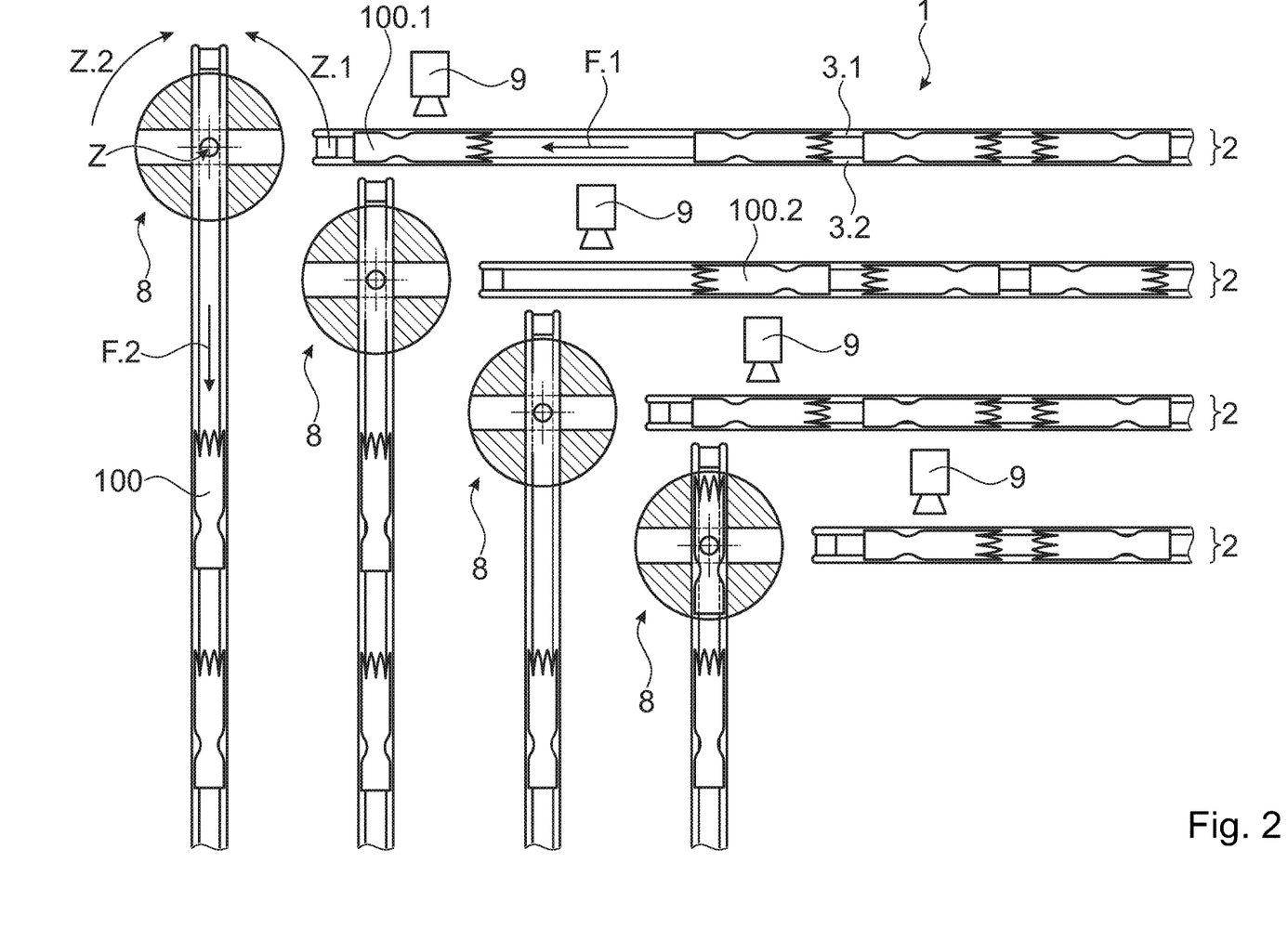
FIG. 2 shows a detail from a conveying apparatus according to the invention.

In order to permit this, a conveying apparatus 1 which is shown as an example is illustrated schematically in FIG. 2. The conveying apparatus 1 shown has a total of four conveyor tracks 2 running parallel in a first conveying direction F.1. After rotation through substantially 90 degrees, the tampon applicators 100 continue to move in a second conveying direction F.2. On the conveyor tracks 2, the tampon applicators 100, 100.1, 100.2 rest on two transport belts 3.1, 3.2 between the latter. The transport belts 3.1, 3.2 are selected in diameter and distance in such a manner that they allow a tampon applicator 100.1, 100.2, 100 to rest thereon in such a manner that the tampon applicator rests on the two transport belts 3.1, 3.2 with at least one contact surface.

The example shown of a conveying apparatus 1 operates with tampon applicators 100, 100.1, 100.2 which have an outer diameter of 15 mm and an overall length of 75 mm. The transport belts 3.1, 3.2 have a diameter of 7.5 mm and are composed of a polyurethane plastic.

The tampon applicators can be supplied as loose articles to the conveying apparatus, wherein a separating station or a shaking funnel can be provided in order to bring (not shown) the tampon applicators onto the conveyor tracks. In the present example, the tampon applicators have already been separated (not shown in FIG. 1) on the conveyor track 2 mounted upstream.

As they are being conveyed in the first conveying direction F.1, the separated tampon applicators 100, 100.1, 100.2 on all of the conveyor tracks pass a detector 9, which visually identifies the orientation of a tampon applicator 100, 100.1, 100.2. In the present example, a first tampon applicator 100.1 passes with a first orientation to the detector and an exemplary second tampon applicator 100.2 passes with a second orientation to a detector. In the present example, the two tampon applicators 100.1, 100.2 are shown with an opposite orientation on two parallel conveyor tracks. Of course, however, the tampon applicators can be supplied in both possible orientations on all of the first conveyor tracks, as is apparent from FIG. 2.

If the first orientation now corresponds to the desired orientation in the second conveying direction F.2, a corresponding signal is transmitted from the detector 9 to a downstream orientation unit 8 to the effect that the tampon applicator 100.1 concerned should be rotated in a first direction of rotation Z.1.

If a tampon applicator 100.2 passes with the second orientation to a detector 9, the latter instructs the downstream orientation unit 8 to carry out a rotation in a second direction of rotation Z.2. Since the orientation units 8 in the present example carry out an angle of rotation of the conveying direction F.1 to the conveying direction F.2 through 90 degrees, in both cases a rotation through 90 degrees is sufficient to permit further conveying in the desired orientation (first orientation). In the present example, as the tampon applicators are being oriented, the conveying direction is changed from the first conveying direction F.1 to the second conveying direction F.2, which runs at a right angle to the first conveying direction.

In the present example, for the purpose of changing the orientation and simultaneously changing the conveying direction, the orientation unit 8 is provided with a turnstile into which a tampon applicator 100, 100.1, 100.2 is introduced. A rotation of the turnstile through 90 degrees suffices, and the orientation unit 8 is ready to receive the next tampon applicator 100, 100.1, 100.2. This permits an overall economical process with as high throughput volumes as possible.

The turnstile of the orientation unit 8 is designed in such a manner that it can be rotated about a central axis of rotation Z in two directions Z.1, Z.2.

Figure 3:
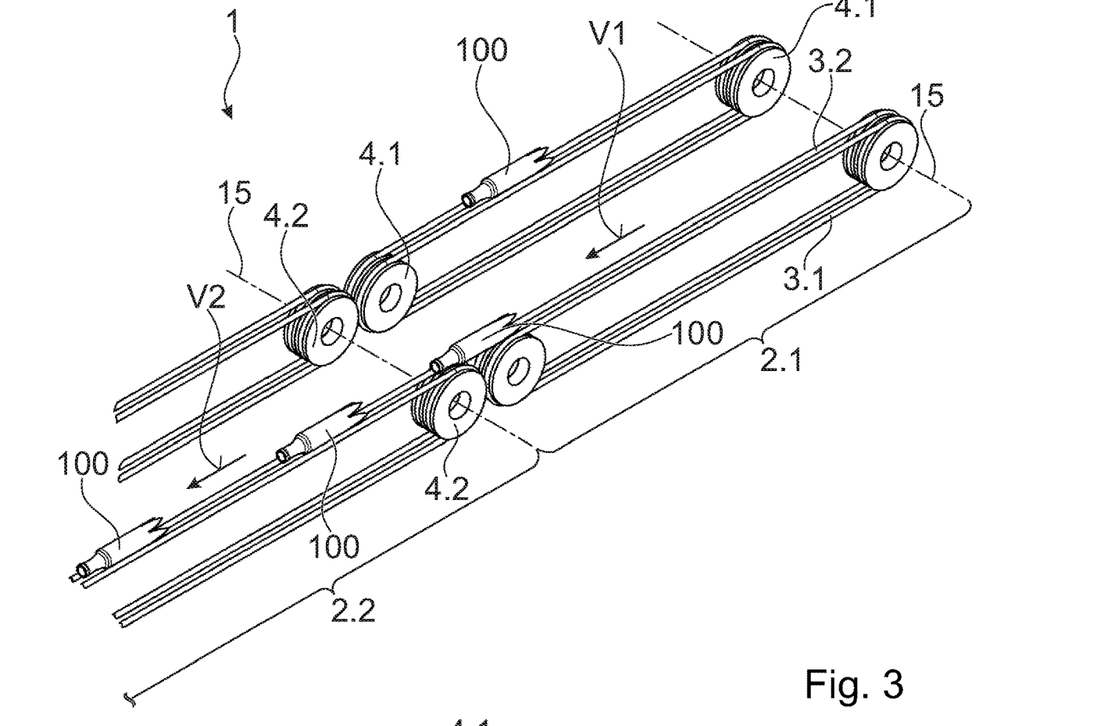
FIG. 3 shows a further detail from a conveying apparatus according to the invention.

An alternative or additional embodiment is illustrated in FIG. 3. This arrangement as a conveying apparatus can be connected, for example, upstream of the conveying apparatus of FIG. 2 or can correspondingly adjoin the conveying apparatus of FIG. 2 as a continuation in the second conveying direction F.2. In the present example, a total of four conveyor tracks are shown. Two first conveyor tracks which are arranged parallel to each other are followed by two subsequent conveyor tracks. These conveyor tracks differ from one another by running over separate rollers 4.1, 4.2. In the present example, the first parallel conveyor tracks are driven by a first conveyor drive 4.1 via a head roller. In the present example, it is of insignificance whether the head roller is driven at the beginning of the conveying section or at the end of the conveying section. For the sake of the example, in the present embodiment, the head roller is driven at the beginning of the first conveyor track. In a corresponding manner, in the present example, the head roller can also be driven at the beginning of the second conveyor portions and conveyor tracks.

One advantage of this conveying apparatus 1 is that it can additionally serve for separating the tampon applicators. In this case, in the first conveyor portion 2.1, the conveyor tracks are driven at a first conveying speed V1, and, in a second conveyor portion 2.2, the conveyor tracks are driven at a second conveying speed V2. For optimum separating, the conveying speed V2 is greater than the conveying speed V1. In the intermediate space between the two conveyor tracks, an applicator which is now possibly in contact with a previous tampon applicator or a following tampon applicator is physically separated therefrom by means of the acceleration. In the present example, the first conveying speed V1 is 0.2 m/s and the second conveying speed V2 is 0.3 m/s.

Alternatively, separating can take place via a corresponding separating roller which engages at a certain rotational speed between the two transport belts 3.1, 3.2 and thus accelerates a tampon applicator away (not shown in FIG. 3).

By means of the space-saving arrangement with conveyor tracks on the basis of transport belts, in particular on the basis of round belts, numerous advantageous geometries can be realized. The conveyor tracks, as illustrated in FIG. 3, can readily be assembled modularly. Depending on whether the conveying speeds V1, V2 have to differ, corresponding drive shafts can be shared between conveyor tracks which are arranged parallel and have the same conveying speed, which is likewise of benefit for the space-saving design.

In FIG. 3, the axes 15 of the conveyor tracks are parallel. A conveyor drive can act via a drive by means of ribbon belts directly on drive shafts in the axes 15 and can thus drive the head roller 4.2.

Figure 4:
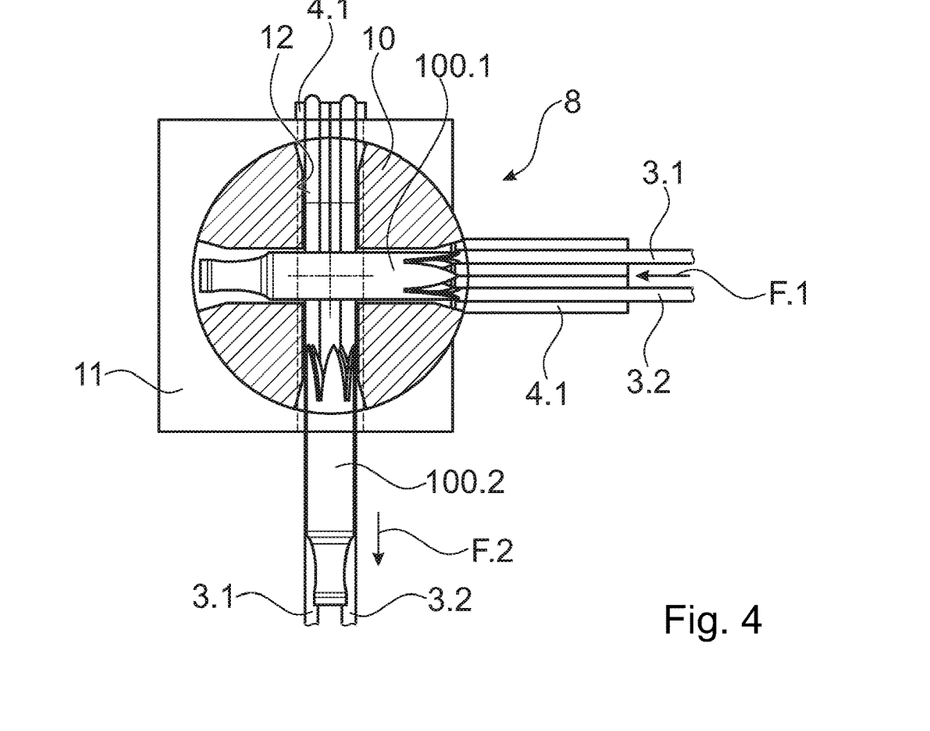
FIG. 4 shows an orientation unit.

FIG. 4 schematically illustrates an orientation unit 8. In order to illustrate the functioning, the orientation unit 8 has just been provided with a tampon applicator 100.1 in a first orientation. For this purpose, the tampon applicator has been pushed via the transport belts 3.1, 3.2 of a conveyor track with a first conveying direction F.1 via a first drive roller 4.1 into a receiving opening of a rotary element 10. The rotary element 10 is configured in the form of a turnstile. The second conveyor track is located below the orientation unit 8 and is driven via a second drive roller 4.2, and likewise has two transport belts 3.1, 3.2, wherein, by way of example, a second tampon application 100.2 is already being conveyed further thereon in a second conveying direction F.2. This has been made possible by the fact that the rotary element 10 has executed a 90 degree rotation and, after said 90 degree rotation is finished, the tampon applicator 100.2 is oriented with its longitudinal axis parallel to the second conveying direction F.2.

A receiving opening provided on a baseplate ensures that said second tampon applicator 100.2 can drop through and has fallen directly onto the conveyor track of the second conveying direction F.2, and has been conveyed away in said conveying direction.

A detector can optionally be installed within this arrangement. For example, an optical sensor which establishes the orientation of the introduced tampon applicator can be provided at the input of the receiving opening of the rotary element 10.

Figure 5:
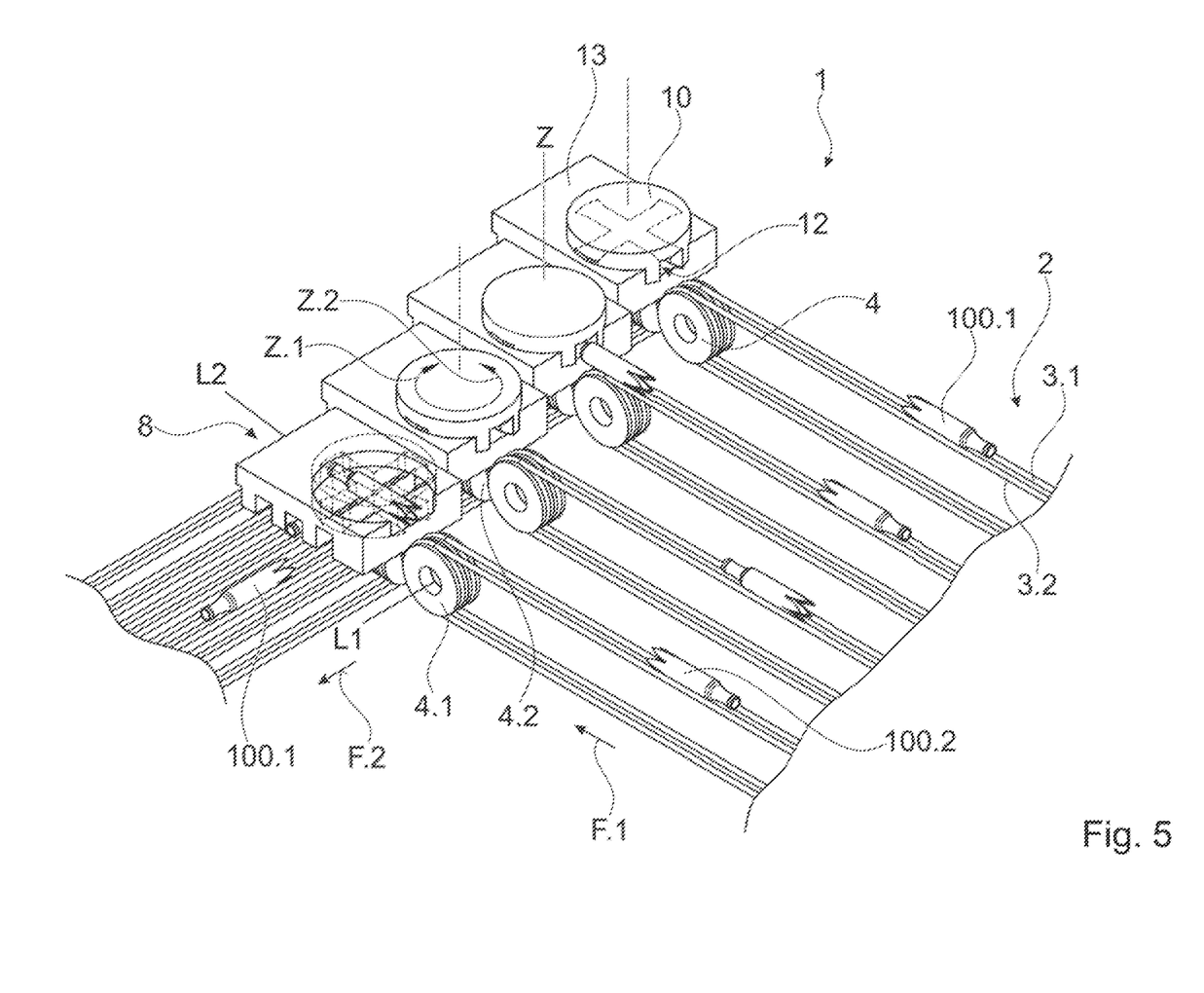
FIG. 5 shows a further detail of a conveying apparatus according to the invention.

In a complex embodiment having a plurality of conveyor tracks, as an advantage of the present invention use can optimally be made of the available space for the conveying, which is illustrated in FIG. 5 with reference to an embodiment of a conveying apparatus 1 according to the invention. Also in this example, the conveyor tracks 2 as a whole execute a 90 degree rotation from a first conveying direction F.1 into a second conveying direction F.2. In this specific example, however, the conveyor tracks 2 are arranged on different planes. Specifically, in the present example, the conveyor track which is distal in the plane of the image is arranged above the following conveyor tracks as far as the proximal conveyor track, which is arranged lowest down.

The conveyor tracks of the first conveying direction F.1 are all arranged parallel to one another and open into corresponding orientation units 8, which are likewise arranged parallel and follow the corresponding height stacking of the conveyor tracks of the first conveying direction F.1.

The orientation units 8 are provided with a turnstile, which is rotatable about an axis of rotation Z, and a housing 13, which permits initial guidance of the rotated tampon applicators 100.1, 100.2. The rotary elements 10 are arranged for rotation in a first direction of rotation Z.1 or a second direction of rotation Z.2 about the central axis of rotation Z. The conveyor tracks are driven by means of conveyor drives 4.1, 4.2 which comprise bearing axes (L1 or L2) which are arranged parallel for all of the conveyor tracks which convey in the same conveying direction F.1, F.2. The direction of rotation is determined by the desired orientation of the tampon applicators in the second conveying direction F.2. A detector (not shown in FIG. 5) detects the orientation of the arriving tampon applicators 100.1, 100.2 and rotates the latter through 90 degrees in the first direction of rotation Z.1 or the second direction of rotation Z.2. In the present example, the tampon applicators 100.1, 100.2 are rotated into the orientation in which the distal proximal end of the tampon applicator 100.1 comes to lie at the front in the conveying direction.

Figure 6:
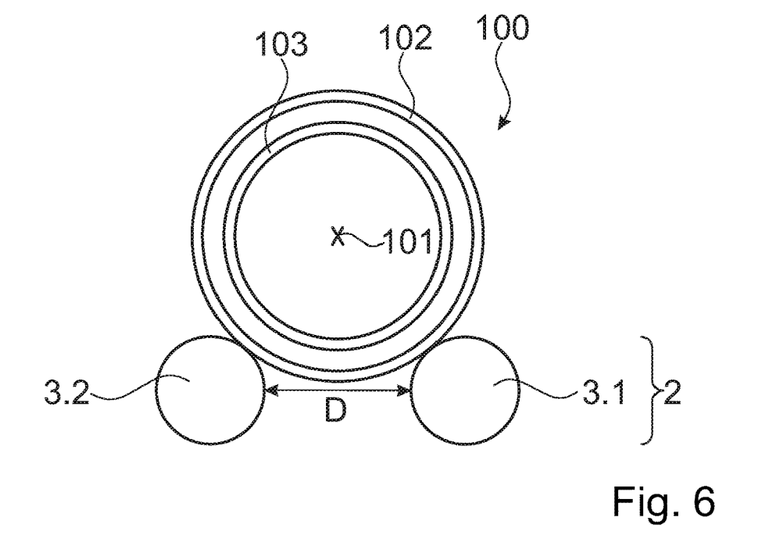
FIG. 6 shows a cross section through a conveyor belt with a tampon applicator resting thereon.

FIG. 6 shows a conveyor track 2 in cross section with a tampon applicator 100 resting thereon. The tampon applicator 100 has a tampon body 102 which defines a lumen into which the tampon can be placed. The plunger 103 has a smaller diameter than the tampon body 102 and can be introduced into said lumen when a tampon is not present. The entire tampon applicator 100 is substantially rotationally symmetrical about a central longitudinal axis 101. It rests on two transport belts 3.1, 3.2 of the conveyor belt. It is in contact here with the two transport belts 3.1, 3.2 and extends into an intermediate space D between the transport belts 3.1, 3.2 in such a manner that, in addition to being supported, it has lateral guidance.

In the present example, said contact region lies in a region of from between 4 and 5 o'clock and 7 and 8 o'clock.

Figure 6A:
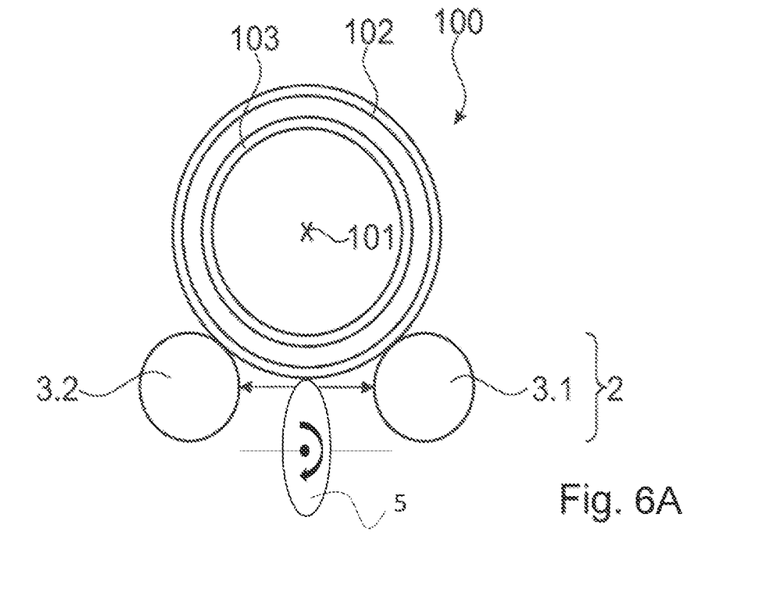
FIG. 6A is a variant of FIG. 6 and shows how a separating roller can intract into the space between the longitudinal axis.

FIG. 6A is a variant of FIG. 6 and shows how a separating roller 5 can interact in the space between the transport belts 3.1, 3.2. The rotation axis of the separating roller 5 is normal to the transportation longitudinal extension (parallel to the bearing axes).

Figure 7:
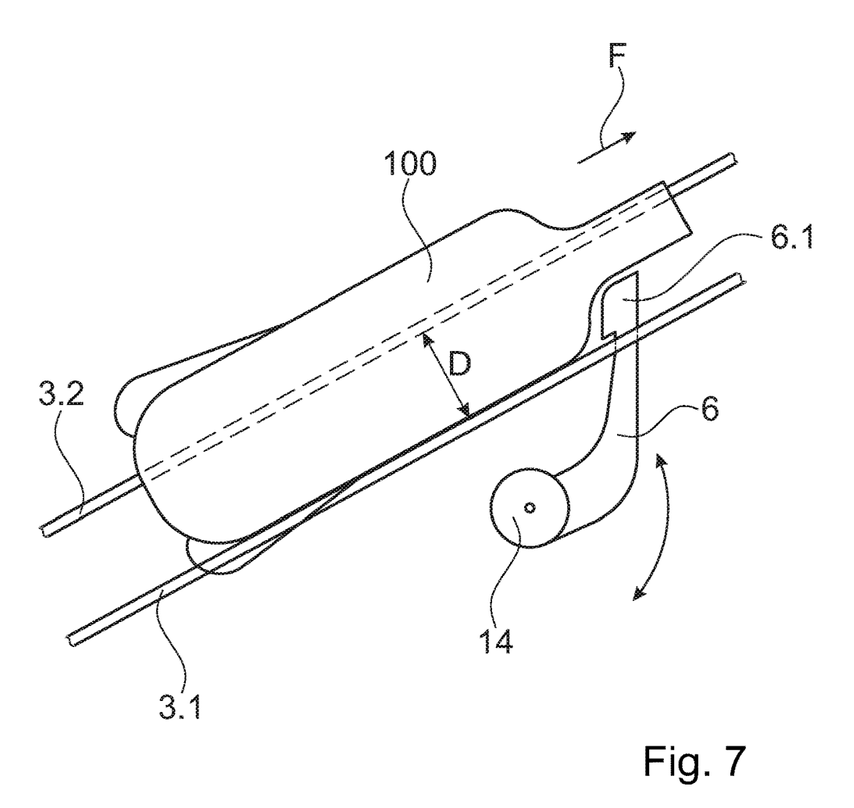
FIG. 7 shows a stopper for a conveying apparatus according to the invention.

FIG. 7 shows a possible embodiment with the functioning of a stopper 6. The stopper, via a stopper head 6.1, is capable of engaging in an intermediate space D between the transport belts 3.1, 3.2 in such a manner that it prevents the tampon applicator 100 from being conveyed further in the conveying direction F. For this purpose, it can be provided with a stopper actuator 14, which can receive a corresponding signal from a detector and can thus interrupt the supply.

Figure 8:
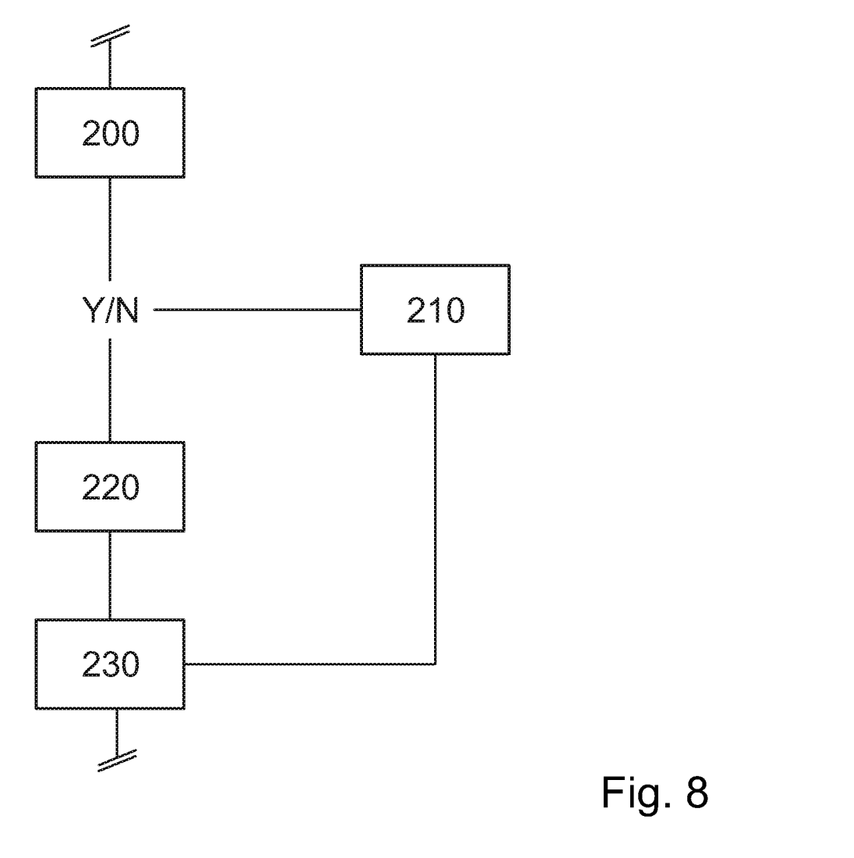
FIG. 8 shows the functioning of an orientation unit.

During operation, in a conveying apparatus according to the invention, as shown in FIG. 8, a supply 200 takes place on a first conveyor track with a certain orientation. It is checked via a detector whether the corresponding orientation corresponds to the desired orientation. Depending on whether the desired orientation has done this, a rotation in a first direction of rotation 210 or a rotation in a second direction of rotation 220 is undertaken before the tampon applicator is transferred onto a second conveyor track having a second conveying direction 230.

In one refinement according to the invention, a plurality of the abovementioned concepts can be implemented in one conveying apparatus. For example, a conveying apparatus according to the invention can comprise a total of four conveyor tracks running parallel in the first conveying direction, said conveyor tracks adjoining a subsequent series of four conveyor tracks which likewise run parallel and have a different conveying speed. These conveyor tracks in turn guide the tampon applicators into four orientation units which correct the corresponding orientation, as outlined above. Said tampon applicators then pass in turn into a series of four conveyor tracks which have a second conveying direction which can be rotated from the first conveying direction through 90 degrees.

Said second series opens into a buffer region which is provided with a series of stoppers and with detectors in order to control the supply of the sorted and oriented tampon applicators to the next processing station, for example an assembly unit.

With the conveying apparatus according to the invention and the corresponding method, a modularly usable system for conveying tampon applicators is provided, the system being efficient and permitting a safe and hygienic process sequence for scalable throughputs.

It is self-evident to a person skilled in the art that, from the specific examples and specific embodiments, further advantageous embodiments emerge which may constitute independent inventions.

LIST OF REFERENCE SIGNS

1 Conveying apparatus
2 Conveyor track
2.1 First conveyor portion
2.2 Second conveyor portion
3.1 First transport belt
3.2 Second transport belt
4 Conveyor drive
4.1 First conveyor drive
4.2 Second conveyor drive
5 Separating roller
6 Stopper
6.1 Stopper head
8 Orientation unit
9 Detector
10 Rotary element
11 Baseplate
12 Receiving opening
13 Housing
14 Stopper actuator
15 Axis
16 Shaft
100 Tampon applicator
100.1 First tampon applicator
100.2 Second tampon applicator
101 Longitudinal axis of the tampon applicator
102 Tampon body
102.1 Petal of the head opening
102.2 Sleeve body
102.3 Gripping region
103 Plunger
104 Distal end/head opening
105 Proximal end/thread opening
200 Supply on first conveyor track
Y/N Desired orientation yes/no?
210 Rotation in first direction of rotation
220 Rotation in second direction of rotation
230 Transfer onto second conveyor track
D Intermediate space between transport belts
F Conveying direction
F.1 First conveying direction
F.2 Second conveying direction
L Bearing axis
  L1 Bearing axis for the belt moving in a first direction
  L2 Bearing axis for the belt moving in a second direction
Z Axis of rotation
Z.1 First direction of rotation
Z.2 Second direction of rotation
V1 First conveying speed
V2 Second conveying speed

The invention claimed is:

1. A conveying apparatus for tampon applicators, having
  a. a first conveyor track, comprising two transport belts which are arranged spaced apart from each other and each have a bearing axis;
  b. a first conveyor drive for driving at least one of the two spaced-apart transport belts;
  c. an orientation unit which is mounted downstream of the first conveyor track, for rotating a tampon applicator supplied to the orientation unit from a first orientation into a second orientation; and
    wherein the transport belts are arranged spaced apart from each other in such a manner that the tampon applicator which is to be conveyed rests on the two transport belts in an intermediate space between the transport belts;
  wherein
    the bearing axes of the transport belts of a conveyor track are arranged parallel; and
    the orientation unit furthermore comprises a rotary element for receiving the tampon applicator supplied to the orientation unit.

2. The conveying apparatus as claimed in claim 1, wherein the orientation unit is arranged between two consecutively arranged conveyor tracks such that the orientation unit is capable of rotating the tampon applicator, which is conveyed in a first orientation to the orientation unit by the first conveyor unit, into a second orientation for further conveying on a second conveyor unit.

3. The conveying apparatus as claimed in claim 2, wherein the orientation unit is also arranged between consecutively arranged conveyor tracks in such a manner that the orientation unit is capable of rotating the tampon applicator, which is conveyed in a first conveying direction to the orientation unit by the first conveyor unit, into a second conveying direction for further conveying on a second conveyor unit.

4. The conveying apparatus as claimed in claim 1, wherein the first conveyor track is arranged on a first conveying plane, and at least one further conveyor track is arranged on at least one second conveying plane.

5. The conveying apparatus as claimed in claim 1, wherein the rotary element is configured as a turnstile and is mounted rotatably between at least two orientations.

6. The conveying apparatus as claimed in claim 1, wherein the orientation unit comprises a baseplate, and wherein the baseplate has a recess through which the tampon applicator which is in a certain, second orientation can drop lengthwise.

7. The conveying apparatus as claimed in claim 1, comprising a plurality of parallel conveyor tracks and/or comprising a plurality of conveyor tracks arranged consecutively in the conveying direction.

8. The conveying apparatus as claimed in claim 7, wherein the plurality of parallel conveyor tracks and/or the plurality of conveyor tracks arranged consecutively in the conveying direction have parallel bearing axes which are designed as drive shafts and can be driven in a manner coupled to a drive.

9. The conveying apparatus as claimed in claim 8, comprising at least two conveyor tracks which are arranged consecutively in the conveying direction and enclose an angle of between 30° and between 120° with respect to one another.

10. The conveying apparatus as claimed in claim 1, wherein the transport belts are symmetrical in cross section perpendicularly to their longitudinal axis.

11. The conveying apparatus as claimed in claim 1, furthermore comprising at least one separating roller which is arranged on the first conveyor track in such a manner that the at least one separating roller engages the tampon applicator in the intermediate space between the two spaced-apart transport belts.

12. The conveying apparatus as claimed in claim 1, furthermore comprising at least one stopper which is arranged on the conveyor track in such a manner that the at least one stopper engages in the intermediate space between the two spaced-apart transport belts.

13. The conveying apparatus as claimed in claim 1, comprising at least one ejector for conveying the tampon applicator from one end of the first conveyor track into an adjoining processing unit, wherein the at least one ejector is arranged on the conveyor track in such a manner that the at least one ejector engages in the intermediate space between the two spaced-apart transport belts.

14. The conveying apparatus as claimed in claim 1, wherein the conveyor drive drives the transport belts via a shaft which is arranged parallel to the bearing axes of said transport belts.

15. A method of conveying tampon applicators with the conveying apparatus as claimed in claim 1, comprising the steps of:
   a. providing at least one tampon applicator;
   b. supplying tampon applicators onto a first conveyor track (2) with two spaced-apart transport belts such that the tampon applicator which is to be conveyed rests on the two transport belts in an intermediate space between the transport belts;
   c. conveying the tampon applicators in a conveying direction.

16. The method as claimed in claim 15, wherein tampon applicators are first of all conveyed on a first conveyor track in a first conveying direction and are subsequently conveyed on a second conveyor track in a second conveying direction.

17. The method as claimed in claim 16, wherein, between the first conveyor track and the second conveyor track, a tampon applicator of the tampon applicators is rotated from a first orientation into a second orientation.

18. The conveying apparatus as claimed in claim 1, wherein all of the bearing axes of the transport belts which convey in a same conveying direction are arranged parallel.

* * * * *